Sept. 7, 1965 K. SCHWENK 3,204,999
SLIDING DOOR, PARTICULARLY FOR MOTOR VEHICLES, WHICH, WHEN
CLOSED, IS FLUSH WITH THE WALL OF THE VEHICLE
Filed April 16, 1963 3 Sheets-Sheet 1
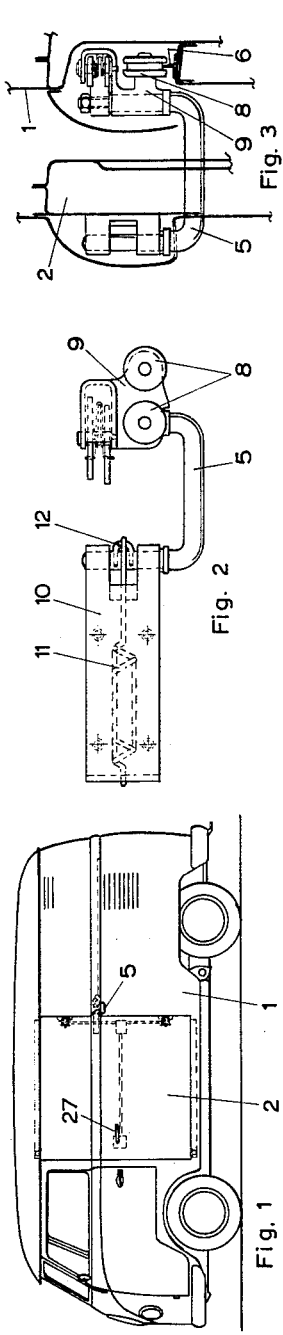
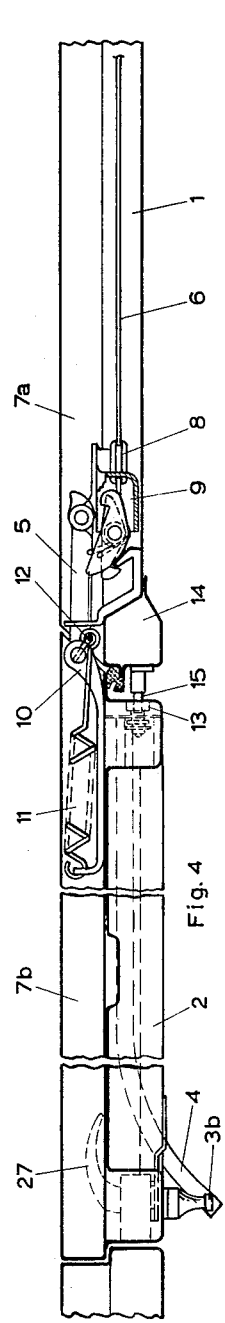
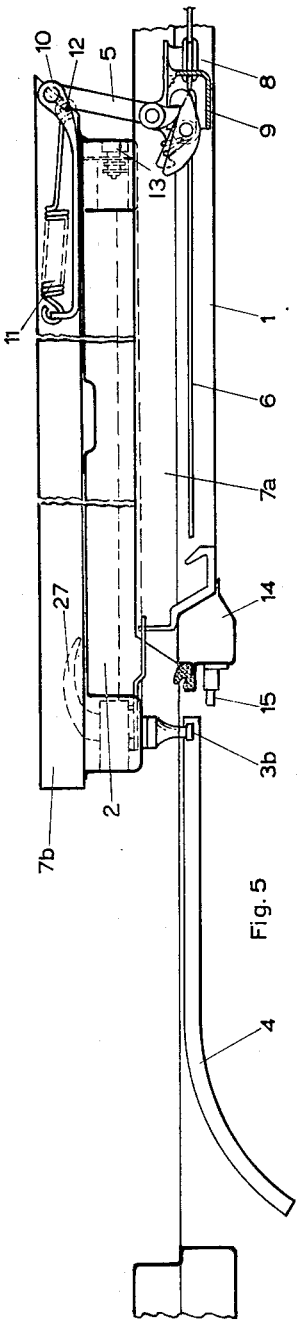
INVENTOR.
Kurt Schwenk
BY
Watson, Cole, Grindle & Watson
Attys.

Sept. 7, 1965  K. SCHWENK  3,204,999
SLIDING DOOR, PARTICULARLY FOR MOTOR VEHICLES, WHICH, WHEN
CLOSED, IS FLUSH WITH THE WALL OF THE VEHICLE
Filed April 16, 1963  3 Sheets-Sheet 2
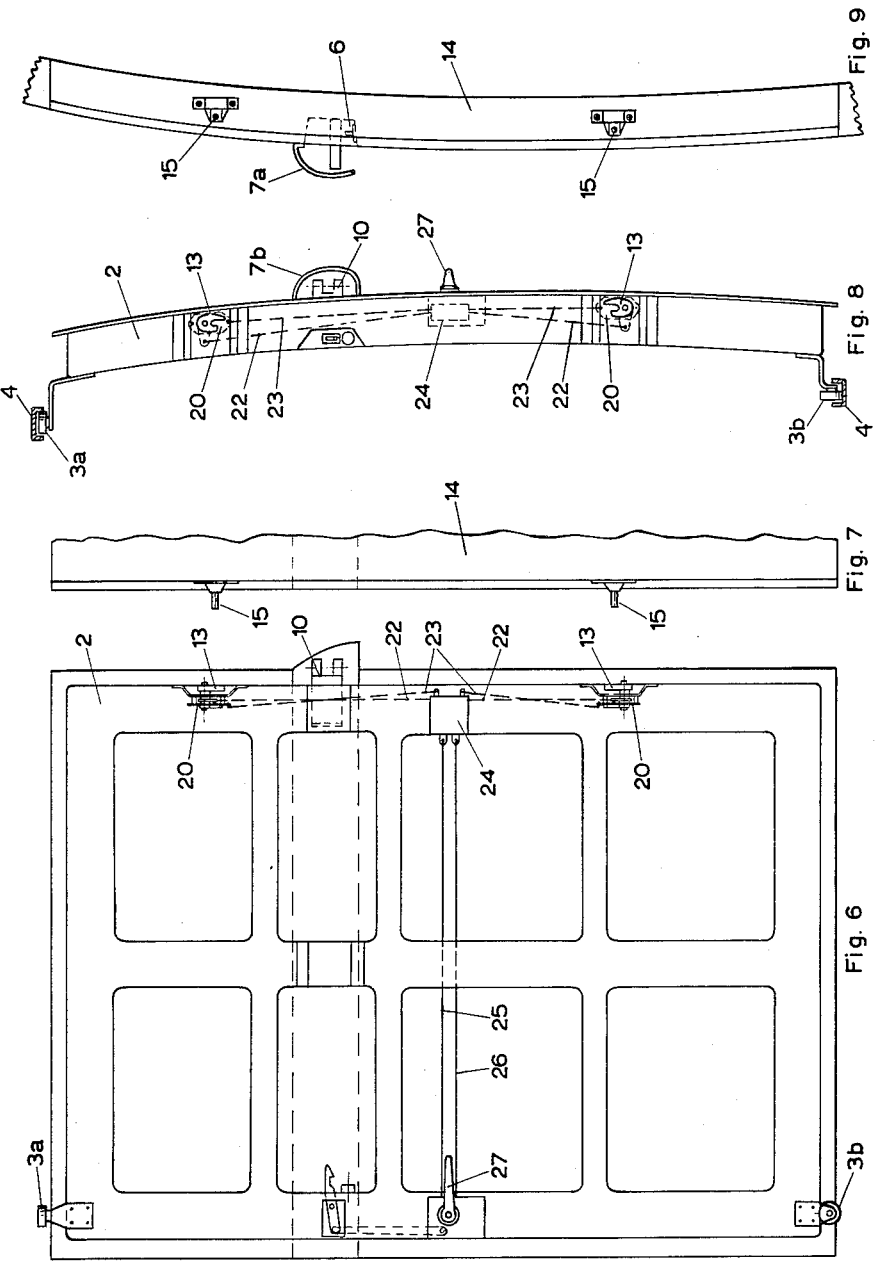
INVENTOR.
Kurt Schwenk
BY
Watson, Cole, Grindle & Watson
Attys.

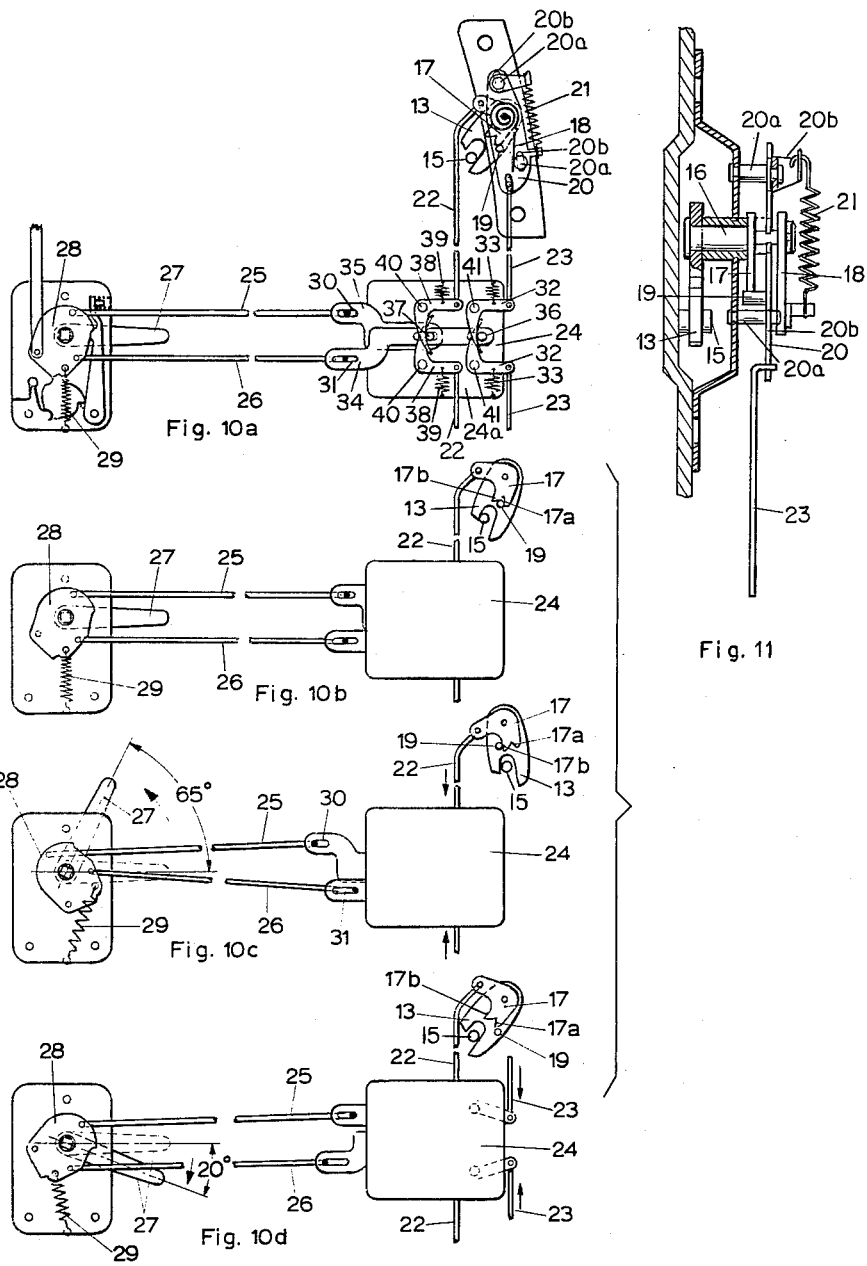

United States Patent Office 3,204,999
Patented Sept. 7, 1965

1

3,204,999
SLIDING DOOR, PARTICULARLY FOR MOTOR VEHICLES, WHICH, WHEN CLOSED, IS FLUSH WITH THE WALL OF THE VEHICLE
Kurt Schwenk, Wolfsburg, Hannover, Germany, assignor to Volkswagenwerk Aktiengesellschaft, Hannover, Germany, a corporation of Germany
Filed Apr. 16, 1963, Ser. No. 273,374
Claims priority, application Germany, Apr. 17, 1962, V 22,368
4 Claims. (Cl. 296—47)

This invention relates to an improvement over the co-pending application Serial No. 84,966, filed January 24, 1961, now Patent No. 3,100,667.

The invention relates to a sliding door, particularly for motor vehicles, which is suspended at three points and, when closed is flush with the vehicle wall and the front and/or rear end or ends of which is or are pulled into the plane of the vehicle wall, towards the end of the closing movement, and there held by swivel latches and bolts.

When the door is being closed and in the last phase of the closing movement during which the door swings into the plane of the wall transversely to the sliding movement, the swivel latches strike against the bolts and are thereby turned so far that a single notch or catch arranged in the lock becomes operative. The closing, which is effected by the momentum of the door, may require considerable force, for example, when the vehicle is on an upward gradient and the closing direction of the door is uphill. A long packing member which has to be compressed or the use of locks which require a considerable lift before they operate, may be the cause for the door having to be forcefully moved with a loud noise when closing.

Therefore, according to the invention a preliminary catch is provided for the swivel latches in addition to the conventional catch for the fully closed position and the swivel latches are connected with the door handle by a rod system, if necessary using a direction-changing member, in such a manner that, during the closing operation, the swivel latches first engage the preliminary catch, preferably under the momentum of the door, and subsequently, possibly after moving a certain distance, engage the main catch which is preferably effected by actuating the door handle. The door is thereby pulled into the catch and positively locked.

Consequently, with the arrangement according to the invention the door need only be actuated slowly using little energy until the swivel latches snap into the preliminary catches so that only a short path of movement, for example 5 millimeters, is necessary before the door is closed completely. The final closing movement of the door from the preliminary catch to the main or final catch is carried out by hand with the aid of the door handle, for example by turning the handle.

According to a further development of the invention, the catch bolt or pin mounted on a catch carrier is on the one hand pressed by a spring against a cam for the purpose of engaging the preliminary catch and the main catch and on the other hand the catch carrier is connected with the door handle by a rod system. This may include a direction-changing or deflecting plate, in such a manner that when the door handle is operated, engagement takes place and the door moves out of the plane of the wall.

Furthermore, the door handle in its normal position is, according to the invention, directed horizontally towards the rear, viewed in the direction of the closing movement of the door, while in its positive locking position it points upwards, preferably at an angle of 65°. In open position the handle points downwards, preferably at an angle of 20°, whereby the door handle always springs back into

2 the horizontal position under the action of a spring after the door has been positively locked or after it has been opened.

In a simple form of construction a single swivel latch cooperating with a preliminary catch and a main catch may also be provided and is preferably located in the middle of the end face of the door.

An embodiment of the invention is illustrated by way of example in the accompanying drawings, in which:

FIG. 1 is a side elevation of a car with a sliding door,
FIG. 2 is a side elevation on a larger scale showing the hinge U-shaped bolt guiding the rear end of the door;
FIG. 3 is an end elevation showing the U-shaped bolt in swung-out position;
FIGS. 4 and 5 are sectional top plan views showing the door in closed and open positions respectively;
FIG. 6 is a side elevation of the inner side of the door;
FIG. 7 is an end elevation of the door of FIG. 6;
FIG. 8 is an end elevation of the door;
FIG. 9 a front end view of the door post shown in FIG. 7,
FIG. 10a is an elevation (viewed from the interior of the car) showing the locking mechanism in open position;
FIGS. 10b to 10d are side views showing the locking mechanism of FIG. 10a in different positions, namely with the preliminary catch engaged (FIG. 10b), with the main catch engaged (FIG. 10c) and in the position at the moment of opening in which the catch pin is pulled down and releases the swivel latch (FIG. 10d); and
FIG. 11 is a side elevation of a swivel latch according to FIG. 10a showing the catch arrangement.

The side wall of the vehicle is designated by 1, the door opening of which is closed by a sliding door 2 located in the plane of the wall 1. The door 2, suspended at three points, runs with the aid of rollers 3a, 3b, FIGS. 6 and 8 mounted at its front end, on rails 4 which guide the front end of the door into the plane of the wall 1. At its rear end the door is guided by means of a U-bolt 5 on the vehicle wall 1 on a rail 6, FIGS. 3 and 9, which is covered by a sheet metal strip 7a on the wall 1 and continued on the door 2 as a strip 7b, FIG. 8. One arm of the U-bolt 5 is fixed in hinge fashion on the door 2 and the other arm on a carriage 9 provided with two rollers 8 running on the rail 6, so that the bolt is hinged to both parts.

On the hinge plate 10 fixed on the door 2 for one arm of the U-bolt 5 a tension spring 11 is mounted which engages a lever 12 on the arm of the U-bolt 5 in such a manner that it assists the outward swing of the U-bolt 5 and the door 2 into open position but on the other hand acts as resistance which has to be overcome by a counter force when closing or swinging the rear end of the door 2 into the plane of the wall 1. On the rear end face of the sliding door 2 a forked swivel latch 13 is arranged at the top and at the bottom. When the door 2 is closed (swung in) these swivel latches 13 engage pins 15 on the face of the door post 14 and lock the closed door 2 at the top and bottom. A cam 17 provided with a preliminary catch 17a and a main catch 17b, FIGS. 10b to 10d, is rigidly connected to each swivel latch 13 by means of a shaft 16 and a spiral leaf spring 18 mounted on the shaft 16 presses the swivel latch 13 with the cam 17 into open position. A catch pin 19 cooperating with the catches 17a, 17b is mounted on a catch carrier 20 movable in vertical direction by means of longitudinal slots 20b on rigid pins 20a, and pulled towards the catches 17a, 17b by a tension spring 21. The swivel latches 13 are guided by pull rods 22 acting against the force of the spiral leaf springs 18 and the catch carriers 20 with their catch pins 19 by pull rods 23 acting against the tension springs 21 through the intermediary of a movement deflecting and distributing plate 24, and similar pull rods 25, 26 transmit the pulling movement to a disc 28 carrying the door handle 27, being linked to this disc 28 in such a manner that when the door handle 27 is actuated (pulled upwards) the swivel latches 13 are shifted in the closing direction thereby engaging the catch pin 19, while when the handle is turned (pressed) in downward direction the catch carrier 20 with the catch pins 19 are drawn away from the catches 17a, 17b on the cam 17, thereby releasing the swivel latches 13. The swivel latches 13 are connected, due to the force of the spiral leaf spring 18 engaging pull rods 22, to the catch carriers 20 with their catch pins 19, by means of the tension spring 21 with the counter pull rod 23 to the distributing plate 24. FIGS. 10a to 10b illustrate the movements of the various parts with the latch 13 through 90° in clear steps. The rods 22 are connected by one arm to an angle lever 38 which at 40 is pivoted to rotate on the base plate 24a of the distributor plate 24 influenced by a spiral spring 39 so that the rod 22 will be moved outwardly. The other arm of the angle lever 38 abuts against a common pin 37 which is secured to a slide 35 which for its part can slide in the distributing plate 24. The slide 35 is connected by a rod 25, to the rotatable disc 28, which by means of the door handle 27 may be rotated in one or the other direction. A spring 29 is connected to the disc 28 so that the door handle 27 will always return automatically to a horizontal normal position.

The rods 23 are connected to one arm of the angle levers 32 which are pivotally mounted at 41 to the base plate 24a of the plate 24 and are influenced by a spring 33 so that the rods 23 will be moved outwardly. The other arm of the angle lever 32 abuts against a common pin 36 which is secured to a slide 34. Also, the slide 34 is guided in the distributor plate 24 and is connected to the disc 28 by means of a rod 26.

The rod 25 is mounted in an elongated slot 30 in the slide 35 and the rod 26 is mounted in an elongated slot 31 in the slide 34. The other ends of the rods 25 and 26 are linked above and below the pivot point of the disc 28.

When the door is to be closed, then the longer arm of the latch 13 will abut against the rigid pin 15 whereby the latch will be slightly turned, FIG. 10b, whereby the pin 19 will engage in the catch 17a, which will prevent a return movement of the door. If now the handle 27 is turned counter-clockwise as to the positions shown in FIGS. 10a and 10b from the middle position upwardly, then the rod 25 will pull the slide 35 to the left, so that its pin 37 will swing the angle lever 38 against the force of its spring 39, whereby the rods 22 will be pulled inwardly and thereby the latches 13 will be rotated in closing position, that is from the position of FIG. 10d to the position of FIG. 10c. Thereby, the pin 19 will be held in the slot 20 by the main catch 17b. By this comparatively small movement, the door will be forced against its frame by the latches 13 as to the pins 15.

The rods 26 will now move to the right freely in the slot 31.

Upon the turning of the door handle 27 from the middle position downwardly, the rod 25 will be moved to the right in the slot 30. Thereby, the rod 26 will move the slide 34 to the left, so that its pin 36 will rotate the angle lever 32 against the force of its spring 33. Thereby the rods 23 will be pulled inwardly, arrows 23, FIG. 10d, so that the carrier 20 will, with its pin 19, be pulled against the force of the spring 21 out of the path of the cam 17 and thereby also the latches 13 connected therewith. Hereby, the latches 13 with their pins may be moved to a free position, FIGS. 10a and 10d. Slots 30 and 31 in the parts of the deflecting mechanism of the plate 24 form idle motion paths for the rods 25 and 26 hooked therein thus ensuring that the disengaging mechanisms remain inoperative during engagement and the engagement mechanisms during disengagement.

The operation is such that during the opening of the door 2 the U-bolt 5 is swung outwards substantially at right angles by the force exerted by the tension spring 11 hooked on to its lever arm 12 and is held in this position by an arresting arrangement shown in FIGS. 4 and 5, but as this arrangement does not form part of the invention it is not described in detail here; the door can then be shifted at first somewhat obliquely but then parallel to the wall 1, following the course of the rails 4 on which the upper and lower rollers 3a, 3b run.

When closing the door 2 by pulling the door handle 27 at first without turning it out of its normal (horizontal) position, the front end of the door 2 is positively guided into the opening in the wall of the vehicle by means of the rollers 3a, 3b running on the rails 4, whereby the kinematic energy which is imparted to the door 2 during the closing operation causes a tensioning of the tension spring 11 provided for opening the door 2, a swinging back of the U-bolt 5 and consequently a swinging in of the rear end of the door into the plane of the wall. The forked swivel latches 13 (FIG. 10a), which in open position point obliquely towards the pins 15 on the rear door point 14, strike against these pins 15 and are turned as far as the preliminary catch 17a and engage therein. By turning the door handle 27 in upward direction, the swivel latches 13 are caused to engage the main catch 17b through the intermediary of the disc 28, rod 25, deflecting plate 24 and rods 22 and the door 2 is thereby drawn into the door opening until it is completely closed (FIG. 10c) after completing the remaining path of movement of only a few millimeters up to the front door post.

On the other hand, if pressure is exerted in downward direction on the door handle 27 the catch pins 19 on the catch carriers 20 are pulled away from the catches 17a, 17b on the cams 17 through the intermediary of the disc 28, rod 26, deflecting plate 24 and rods 23, thereby releasing the swivel latches 13 so that, under the influence of the spiral spring 18 the latch 13 will be forced to rotate from the position of FIG. 10c to the position of FIG. 10d, the door 2 swings open in the manner above described and its rear end swings out of the plane of the wall.

It is obvious that the mechanisms according to the invention allow the door 2 to be closed with somewhat greater momentum so that the swivel latches 13 jump or by-pass the preliminary catch and immediately engage the main catch 17b, thereby rendering unnecessary subsequent final locking by hand.

The invention is by no means restricted to the embodiment illustrated. The locking may, for example, be effected by a single swivel latch preferably fitted in the middle of the door 2, instead of by two swivel latches 13 arranged at the top and bottom of the door respectively. In this case, due to the omission of the deviating and distributing plate 24 as well as the four pull rods, a very simple arrangement is obtained which, however, will have to be of stronger construction owing to the strong forces which occur.

What is claimed is:

1. Sliding door latching mechanism for a door suspended at three points, especially for motor vehicles, which in closed position is flush with a vehicle wall and which is drawn into the plane of the vehicle wall towards the end of the closing movement, comprising a swivel latch, a cam pivotally connected to the swivel latch having a main catch for holding the door in fully closed position and a preliminary catch operable just before the door reaches its fully closed position, a rod system including a movement-deflecting plate connecting said latch with a door handle, and means operable when the swivel latch first engages the preliminary catch by the momentum of the closing door and then, after moving a short distance, engages the main catch when the handle is manipulated so that the door is thereby drawn into the plane flush with a wall and positively locked.

2. Sliding door latching mechanism according to claim 1, in which a catch carrier and hand catch bolts are provided with the bolts being mounted on the catch carrier.

3. Sliding door latching mechanism according to claim 1, in which the door handle in normal position points horizontally towards the rear and in positively locking position the handle points upwards at an angle of approximately 65°, and in opening position the handle points downwards at an angle of approximately 20°, and, after the door has been positively locked or has been opened, the handle automatically springs back into its horizontal position.

4. Sliding door latching mechanism according to claim 1, in which the means to operate the single swivel latch with the preliminary catch and the main catch is arranged in the middle of the door.

References Cited by the Examiner

UNITED STATES PATENTS 3,100,667 8/63 Schwenk _____ 296—47

FOREIGN PATENTS 709,914 6/54 Great Britain.
1,144,130 2/63 Germany.

BENJAMIN HERSH, *Primary Examiner.*

A. HARRY LEVY, MILTON BUCHLER, *Examiners.*